(12) United States Patent
Nelson

(10) Patent No.: US 7,571,717 B2
(45) Date of Patent: Aug. 11, 2009

(54) TURBOCHARGER SYSTEM

(76) Inventor: Thomas N. Nelson, 9318 Oso Ave., Chatsworth, CA (US) 91311

( * ) Notice: Subject to any disclaimer, the term of this patent is extended or adjusted under 35 U.S.C. 154(b) by 0 days.

(21) Appl. No.: 11/689,056

(22) Filed: Mar. 21, 2007

(65) Prior Publication Data

US 2008/0229743 A1 Sep. 25, 2008

(51) Int. Cl.
*F02B 33/00* (2006.01)
*F02B 33/44* (2006.01)
(52) U.S. Cl. ............................. 123/562; 60/612
(58) Field of Classification Search ................. 123/562; 60/612
See application file for complete search history.

(56) References Cited

U.S. PATENT DOCUMENTS

| | | | |
|---|---|---|---|
| 4,145,875 A * | 3/1979 | Liddle et al. .................. 60/773 |
| 5,741,123 A * | 4/1998 | Pauly .......................... 123/565 |
| 6,378,309 B1 * | 4/2002 | Divecha et al. ............. 123/562 |
| 6,564,783 B2 * | 5/2003 | Chou et al. .................. 123/562 |
| 2003/0088357 A1 * | 5/2003 | Itoyama ................. 123/568.16 |
| 2004/0187475 A1 * | 9/2004 | Usab et al. ..................... 60/204 |
| 2005/0172629 A1 * | 8/2005 | Baumann ...................... 60/612 |
| 2005/0188943 A1 * | 9/2005 | Gonzalez et al. ............ 123/245 |

FOREIGN PATENT DOCUMENTS

JP 56115820 A * 9/1981

* cited by examiner

*Primary Examiner*—Thomas E Denion
*Assistant Examiner*—Mary A Davis
(74) *Attorney, Agent, or Firm*—Kelly Lowry & Kelley, LLP

(57) ABSTRACT

A turbocharger system for an engine includes first and second turbochargers, having air intake impellers which rotate in opposite directions. This enables the first and second turbochargers to be mounted on opposite sides of an engine in a symmetrical fashion, resulting in an aesthetically pleasing arrangement as well as air intake and exhaust piping being of the generally same length and configuration to optimize engine performance.

17 Claims, 4 Drawing Sheets

TURBOCHARGER SYSTEM

BACKGROUND OF THE INVENTION

The present invention generally relates to turbochargers. More particularly, the present invention relates to a turbocharger system having first and second turbochargers each having an air intake impeller which rotate in opposite directions, so that the turbochargers can be arranged in a symmetrical fashion with respect to the engine block, and provide engine performance benefits.

A turbocharger is an exhaust gas-driven compressor used to increase the power output of an internal-combustion engine by compressing air that is entering the engine, thus increasing the amount of available oxygen. Turbochargers can offer a considerable increase in engine power with only a slight increase in weight.

The mechanical concept of a turbocharger revolves around three main parts. A turbine is driven by the exhaust gas of an internal combustion engine to spin an impeller whose function is to force more air into the engine's intake, or air supply. A central hub rotating assembly includes a rod extending between the turbine and the impeller, and includes bearings, lubrication, cooling, etc. to enable it to rotate at high speeds. The exhaust turbine is contained within an exhaust portion, or folded conical housing, on one side of the center hub rotating assembly, while the impeller is contained within its own folded conical housing intake air compressor portion on the opposite side of the center hub rotating assembly. These housings or portions collect and direct the gas flow.

More particularly, as illustrated in FIG. 1, the exhaust portion or housing 12 and 22 of each turbocharger 10 and 20 includes an exhaust gas inlet 14 and 24 which is operably connected to exhaust pipes 32 and 34 extending from the exhaust outlets of the engine 30. The exhaust gases, under pressure, impinge upon front faces of a plurality of blades of the turbine, causing it to spin. If the pressure of the exhaust gases becomes too great and/or the turbine spins too rapidly, a wastegate 36 and 38 is typically provided so as to vent exhaust gas or redirect the exhaust gas such that it is not directed against the turbine.

The spinning of the exhaust turbine by the exhaust gases causes the shaft or rod within the center hub rotating assembly to rotate, thus rotating the impeller 16 and 26. The impeller has a plurality of blades configured such so as to have front faces which draw in air, and push the air in a direction so as to compress the air. This compressed air is then used in the internal combustion engine 30, which increases the efficiency of the engine, enables burning of additional fuel, and thus generates more power. Typically, only the downward stroke of a piston creates an area of low pressure in order to draw air into the cylinder. However, the turbocharger 10 or 20 increases the pressure at the point where air is entering the cylinder, and the amount of air brought into the cylinder is increased.

While performing generally adequately, there are disadvantages with the current turbochargers which have been traditionally used. That is, turbochargers have always been created in the past with impellers that rotate in a clockwise direction. The disadvantages of this arrangement are not readily apparent. However, due to the fact that the air intake impellers for both turbochargers 10 and 20 rotate clockwise, the first and second turbochargers 10 and 20 mounted onto an engine block are not symmetrical. For example, as illustrated in FIG. 1, a V-block engine 30 is shown with prior art turbochargers 10 and 20 installed thereon. Those skilled in the art will appreciate that a V-block engine refers to an engine having cylinders and pistons angled with respect to another so as to create a generally V-shape, such as a V-6, V-8, etc. engine block. On one side of the engine 30 the exhaust pipes 32 extend from the exhaust outlets of these cylinders and extend to the exhaust intake port 14 of the first turbocharger 10. Similarly, exhaust pipes 34 extend from exhaust outlets of the cylinders on the opposite side of the engine 30 to the exhaust intake port 24 of the second turbocharger 20. Also, air intake pipes 40 and 42 are attached to the air intake ports 18 and 28 of each of the first and second turbochargers 10 and 20. Due to the fact that the air intake impellers 16 and 26 of each turbocharger rotate in a clockwise direction, the first and second turbochargers 10 and 20 must be installed and arranged in an asymmetrical fashion. This is undesirable aesthetically.

Moreover, as shown in FIG. 1, the configuration and the lengths of the exhaust pipes 32 and 34 extending from the engine 30 to the first and second turbochargers 10 and 20 are not the same. In the illustrated example, the exhaust pipe 34 connected to the turbocharger 20 on the right-hand side of the engine 30 has much more dramatic bends than those on the left-hand side of the engine 30. Typically, the air intake pipes 40 and 42 are also of a different configuration and length, such as the air intake pipe 42 on the right-hand side having bends whereas the intake pipe 40 in the left is generally straight. The difference in lengths and bends in the intake and exhaust piping create a negative impact on the engine. In fact, after installing turbochargers on an engine, it is necessary to take these differences into account when tuning the engine so as to obtain optimal engine performance.

Accordingly, there is a continuing need to provide a turbocharger system in which the first and second turbocharger impellers rotate in opposite directions, such that the turbochargers can be installed symmetrically in order to overcome the aforementioned disadvantages. The present invention fulfills these needs, and provides other related advantages.

SUMMARY OF THE INVENTION

The present invention resides in a turbocharger system for an engine. The system generally comprises a first turbocharger including an exhaust portion having an exhaust turbine disposed therein and rotatable in response to engine exhaust gasses acting thereon. An air compressor portion of the first turbocharger includes an impeller therein operably connected to the exhaust turbine so as to rotate in a clockwise direction as the exhaust turbine rotates. Typically, a rotatable rod extends between the exhaust turbine and the air compressor impeller. The air compressor impeller of the first turbocharger includes a plurality of fan blades generally oriented such that front surfaces thereof face a first direction, that is a clockwise direction, so as to compress intake air.

A second turbocharger includes a second exhaust portion having an exhaust turbine disposed therein and rotatable in response to engine exhaust gases acting thereon. A second air compressor portion includes an impeller therein operably connected to the exhaust turbine, such as by means of a rotatable rod extending between the exhaust turbine and air compressor impeller, so as to rotate in a counter-clockwise direction as the second exhaust turbine rotates. The second turbocharger impeller includes a plurality of fan blades generally oriented such that front surfaces thereof face a second direction, that is a counter-clockwise direction, so as to compress intake gas.

The turbocharger system of the present invention is particularly adapted for a V-block engine, having a first set of exhaust outlets on a first side of the engine, and a corresponding number of exhaust outlets on a second side of the engine. A first set of exhaust pipes comprising a plurality of exhaust pipes extend from the first engine exhaust outlets to the exhaust portion of the first turbocharger. A corresponding second set of exhaust pipes comprising a plurality of exhaust pipes extend from the second engine exhaust outlets to the exhaust portion of the second turbocharger. As the impellers of the first and second turbocharger rotate in opposite directions (clockwise and counter-clockwise), the respective first and second sets of exhaust pipes are generally equal in length and configuration. This is due to the fact that the exhaust inlet ports of the first and second turbocharger are symmetrical when installed on the engine.

The first and second turbochargers also each include an air intake port, the air intake ports of the first and second turbochargers being symmetrical when installed on the engine due to the rotation of the respective impellers in opposite directions. Thus, first and second air intake pipes connected to the air inlet port of the respective first and second turbochargers are of generally the same length and configuration.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a turbocharger system for an engine. As described above, existing turbocharger systems, that is engines having two turbochargers mounted thereon, present several drawbacks. Due to the fact that the turbocharger and air intake compressor impellers rotate in the same direction, the turbochargers themselves must be mounted to the engine in an asymmetrical fashion, which is aesthetically unpleasing and creates differences in the lengths and configurations of the air intake and exhaust piping extending to each turbocharger. As will be more fully described herein, the present invention resides in a turbocharger system wherein the first and second turbochargers have impellers which rotate in opposite directions, such that the turbochargers can be mounted on an engine, particularly a V-block engine, in a symmetrical fashion, resulting in the intake and exhaust piping being of the same length and configuration.

Figure 1:
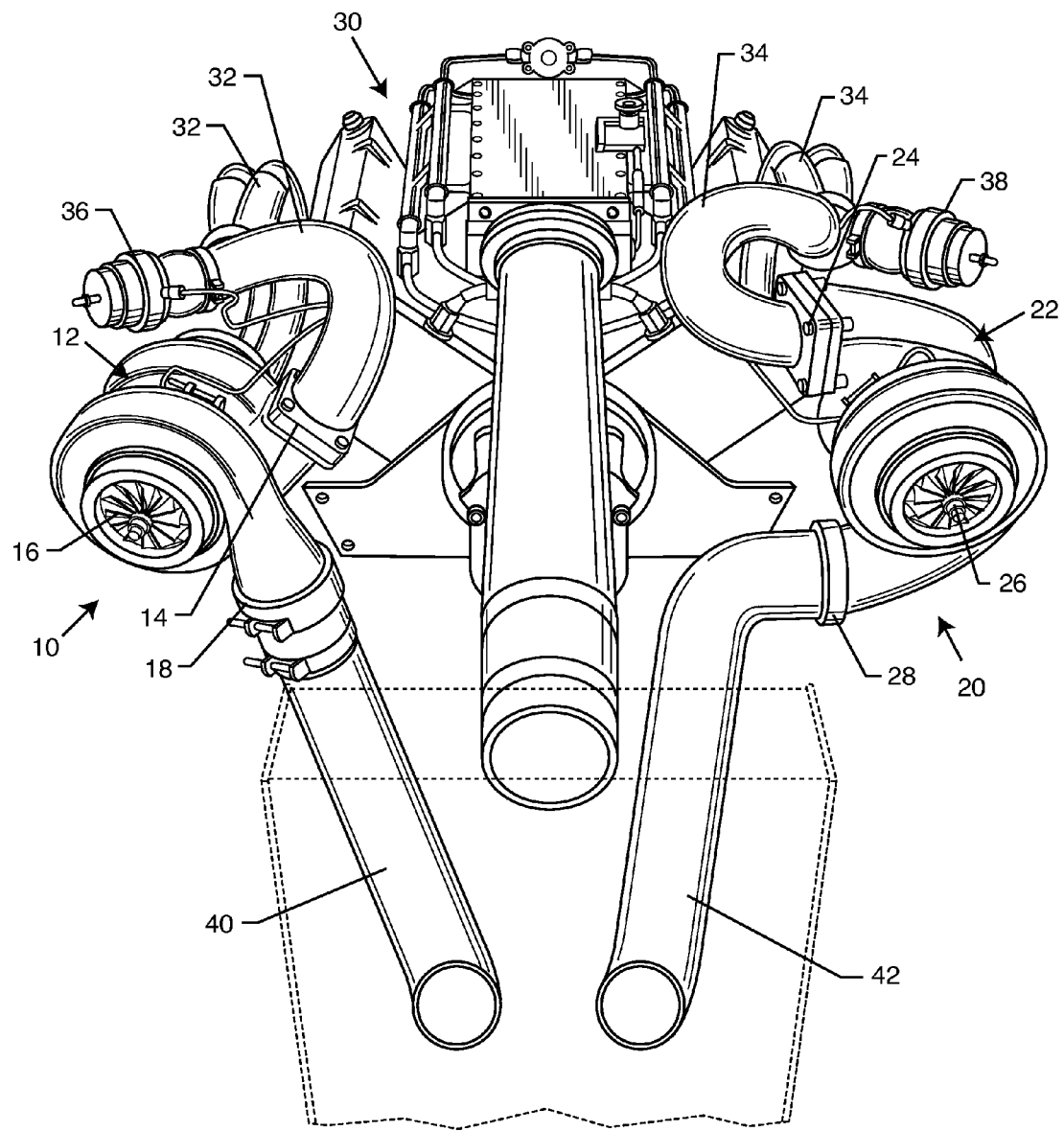
FIG. 1 is a front perspective view of an engine having first and second turbochargers mounted thereon, in accordance with the prior art.
Figure 2:
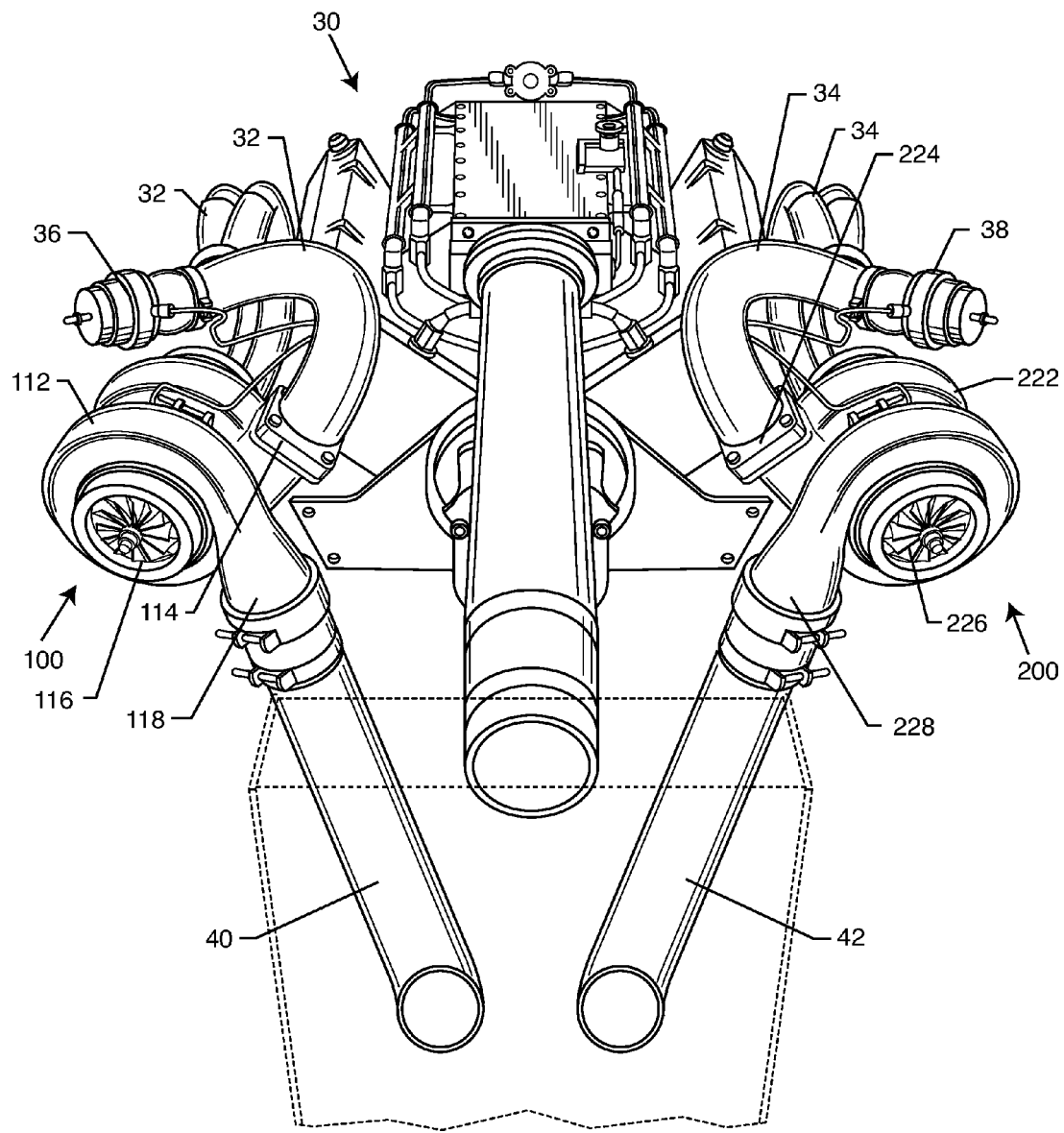
FIG. 2 is a front perspective view similar to FIG. 1, but incorporating the turbocharger system of the present invention.

This is illustrated in FIG. 2, wherein the first and second turbochargers 100 and 200 are operably mounted to a V-block engine 30. The first turbocharger 100 includes an impeller 116 which rotates in either a clockwise or counter-clockwise direction so as to compress air which is delivered to air intake piping 40, and delivered to the engine 30 for use in the combustion chamber. The second turbocharger 200 includes an impeller 226 which rotates in the opposite direction of the impeller 116 of the first turbocharger 100. The impeller 226 achieves the same purpose of compressing air which is delivered to the air intake piping 42 for use in the internal combustion engine 30. However, due to the fact that it rotates in an opposite direction, the first and second turbochargers 100 and 200 can be mounted to the engine 30 in a symmetrical, or mirror-image, fashion.

For example, referring to FIG. 2, it will be noted that the exhaust inlet port 114 of the first turbocharger 100 and the exhaust inlet port 224 of the second turbocharger 200 are a mirror-image of one another such that the first exhaust inlet 114 has a position relative to the engine block 30 and the second exhaust inlet 224 of the second turbocharger 200 is at approximately the corresponding spot and orientation with respect to the engine block 30, but on the opposite side of the engine block 30. It will also be noted that the exhaust inlets 114 and 224 are similarly angled towards the engine block 30. That is, for purposes of illustration and example, the first exhaust inlet port 114 is at approximately a thirty degree angle with respect to the engine 30, whereas the second exhaust intake 224 is at an approximately one hundred fifty degrees, or thirty degrees towards the engine 30.

Similarly, the air intake ports 118 and 228 of the turbochargers 100 and 200 are arranged and oriented in a mirror-image fashion. That is, they are relatively equally separated from the engine 30, and are angled towards the engine block 30 in a mirror-image manner. If one were to draw imaginary vertical and horizontal access lines, the air intake port 118 of the first turbocharger 100 is positioned at approximately three hundred fifteen degrees, whereas the air intake port 228 of the second turbocharger 200 is at approximately two hundred twenty-five degrees, both angled approximately forty-five degrees with respect to a central line of the V-block engine 30. Of course, it will be appreciated by those skilled in the art that the exact position or relative angle of the exhaust ports 114 and 224 and air intake ports 118 and 228 are not critical and can change depending upon the turbochargers used, the engine upon which it is mounted, etc. However, due to the arrangement of the present invention, there will be symmetry between the turbochargers 100 and 200 themselves, including the placement and orientation of the exhaust air inlets 114 and 224, and the air intake inlets 118 and 228.

Figure 3:
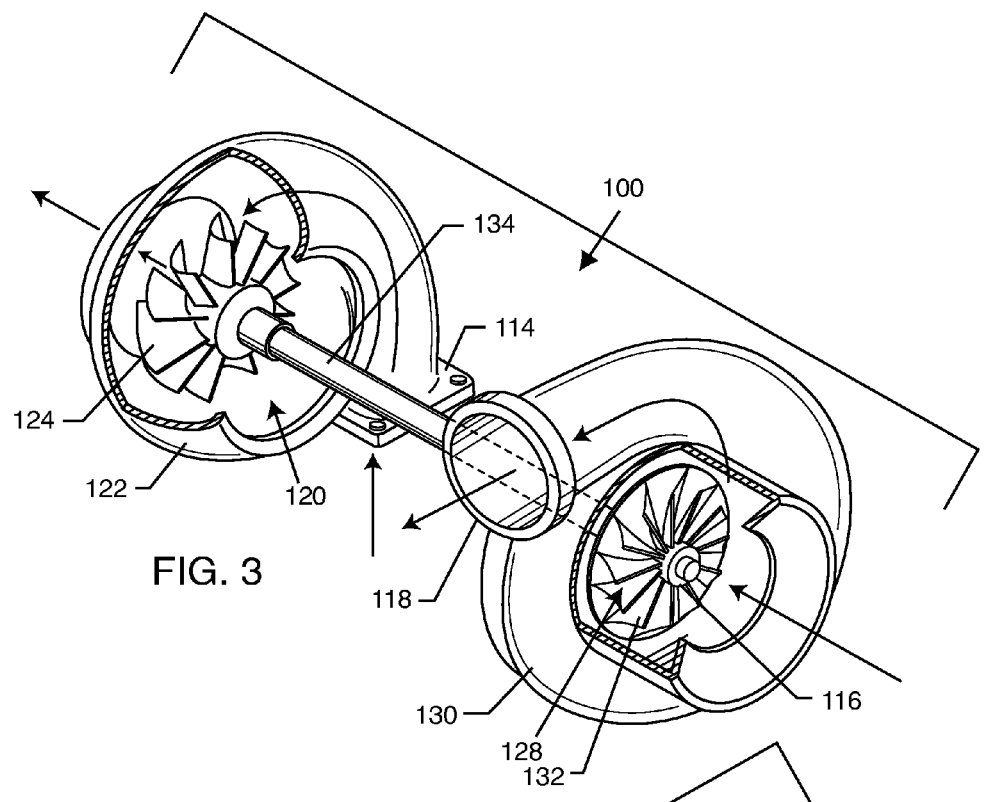
FIG. 3 is a partially exploded and cut-away view of a first turbocharger used in accordance with the turbocharger system of the present invention.
Figure 4:
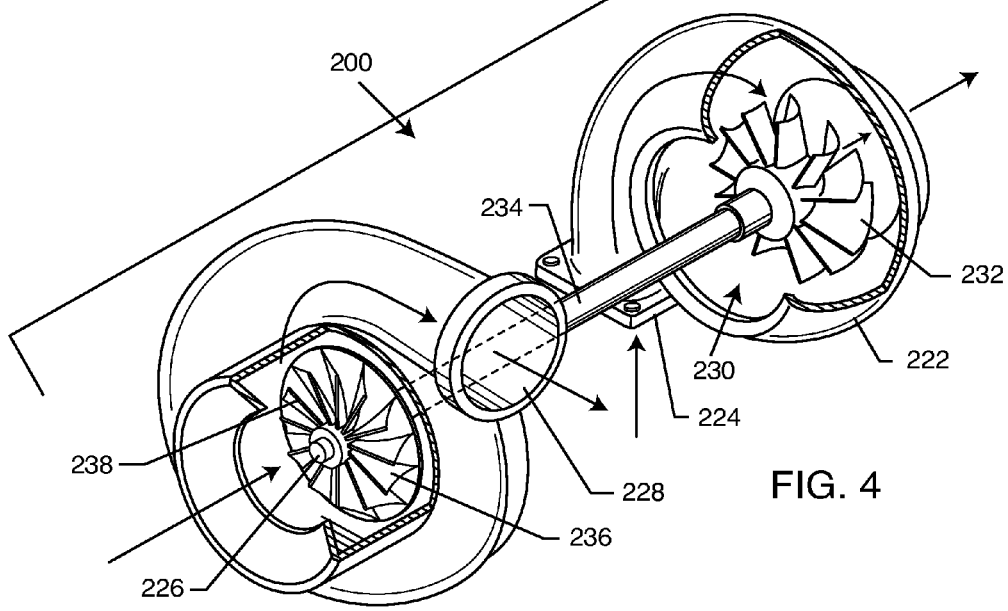
FIG. 4 is a partially exploded and cut-away perspective view similar to FIG. 3, but illustrating the second turbocharger of the turbocharger system of the present invention.
Figure 5:
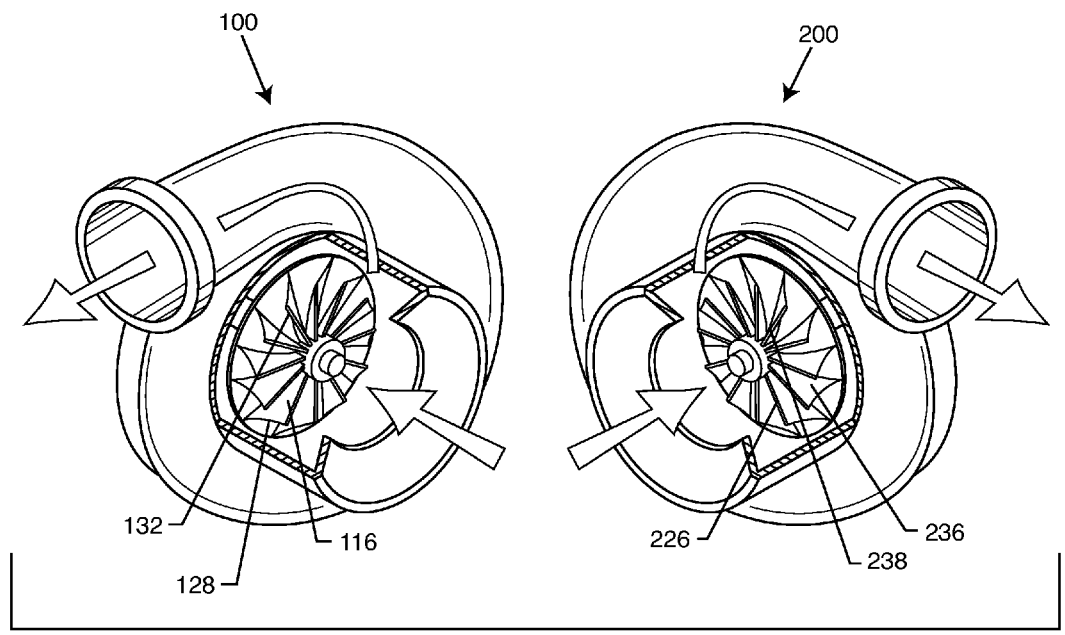
FIG. 5 is a diagrammatic view illustrating an air intake portion of each of the first and second turbochargers, with the impeller of each rotating in an opposite direction, in accordance with the present invention.

With reference now to FIGS. 3-5, this symmetry is attained due to the turbocharger's internal components rotating in opposite directions with respect to one another. That is, the internal components of the first turbocharger 100 will rotate in a first direction such as counter-clockwise, whereas the internal components of the second turbocharger 200 will rotate in the opposite direction, such as clockwise. FIGS. 3 and 4 are simplified drawings illustrating this concept.

In FIG. 3, the first turbocharger 100 is illustrated as including the exhaust air inlet 114 which provides access of the exhaust gases from the exhaust pipes 32, extending between engine exhaust outlets to the exhaust inlet 114 of the turbocharger 100. An exhaust turbine 120 is rotatably disposed within the exhaust turbine housing or portion 122. The exhaust turbine 120 comprises a plurality of fan blades 124 which are oriented such so as to make contact with the exhaust gases (shown by the arrows) such that the turbine 120 spins in response to the contact with these exhaust gases. The exhaust gases are then directed to additional exhaust piping, catalytic converters, mufflers, etc. In the event that the exhaust gas pressure becomes excessive, the waste gate 36 is used to divert the exhaust gases and reduce pressure. This will, for example, prevent the exhaust turbine 120 from spinning too rapidly. However, it will be appreciated that turbines often rotate at speeds in the tens or hundreds of thousands of revolutions per minute.

With continuing reference to FIG. 3, ambient intake air is brought into the turbocharger 100 by means of an impeller 116 having a plurality of fan blades 128, each blade 128 having a front surface 132 which faces the direction of rotation, so as to bring air (shown by the arrows) into the air intake portion 130 of the turbocharger 100 and compress the air for delivery to the air intake piping, which provides the air to the internal combustion engine for use in burning the fuel, as is well known with internal combustion engines.

The exhaust turbine 120 and the impeller 116 are interconnected, such as by shaft 134 such that the rotation of the exhaust turbine 120 results in rotation of the impeller 116. It will be appreciated by those skilled in the art that there is usually a center hub rotating assembly sandwiched between the exhaust portion housing 122 and the air intake portion housing 130 which not only provides means for connecting the freely rotatable exhaust turbine 120 and air intake impeller 116, but also includes bearings, and a lubrication and even a cooling system.

With reference now to FIG. 4, a diagrammatic view of the second turbocharger 200 is provided, similar to that illustrated and described in FIG. 3. The principle of operation is similar. The exhaust inlet port 224 is connected to the exhaust piping 34 extending from the engine 30 and provides pressurized exhaust gases (shown by the arrows) into the exhaust portion or housing of the turbocharger 200. An exhaust turbine 230 includes a plurality of fan blades 232 upon which the exhaust gases impinge, causing the fully rotatable exhaust turbine 230 to rotate. This rotates the connecting means or rod 234, causing the impeller 226 to rotate, and its individual fan blades 236, and particularly front faces thereof 238 to contact the air and compress it for use in the internal combustion engine, as described above.

Although the first and second turbochargers 100 and 200 have generally the same components and the same general operation, they are different in the sense that the impellers 116 and 226 are configured to rotate in opposite directions. That is, looking at the turbocharger 100 from the impeller end 116, in the first turbocharger 100, the turbine 120 rotates in a counter-clockwise direction, causing the impeller 116 to rotate in a counter-clockwise direction. Conversely, when viewing the second turbocharger 200 from the impeller side 226, the exhaust gases impinge upon and rotate the exhaust turbine 230 in a clockwise direction, resulting in the impeller fan blades 236 also rotating in a clockwise direction, such that the front faces thereof contact the incoming ambient air and compress it before diverting it to the air intake pipes 42. Thus, the impellers 116 and 226 (as well as the exhaust turbines 120 and 230) rotate in opposite directions for each turbocharger 100 and 200. This, of course, requires that the fan blades 124 of the exhaust turbine 120 be oriented and configured so as to have front faces facing a first direction, whereas the front faces of the fan blades 232 of the exhaust turbine 230 of the second turbocharger 200 are configured to face a generally opposite direction, such that each rotate in generally opposite directions. Similarly, the front faces 132 and 238 of the first and second impellers 116 and 226 face opposite directions and the respective fan blades 128 and 236 are configured and oriented generally opposite one another so as to effectively capture and compress the air as they rotate in generally opposite directions.

This is illustrated in FIG. 5, where the impellers 116 and 226 generally draw air therein, but the fan blades 128 and 236 are configured differently such that front faces thereof 132 and 238 are curved and scoop or push air in the generally opposite directions in which the impeller assemblies 116 and 226 rotate.

With reference again to FIG. 2, as described above, this arrangement provides symmetry between the first and second turbochargers 100 and 200 when they are mounted onto an engine, such as the illustrated V-block engine. It will be noted that not only are the turbochargers themselves symmetrical or have a mirror-image, but this results in symmetry between other components of the engine as well. For example, the waste gates 36 and 38 are now generally symmetrical, or have a mirror-image with respect to one another, whereas they otherwise would not be. Similarly, the exhaust piping 32 extending between the engine exhaust outlets and the exhaust intake port 114 of the first turbocharger 100 and the exhaust piping 34 extending between the exhaust outlets on the generally opposite side of the engine 30 to the exhaust inlet 224 of the second turbocharger 200 are generally the same length and configuration. That is, they have approximately the same bends as one another and thus the same length. Similarly, the air intake piping 40 and 42 can have the same configuration (bends) and length. Those skilled in the art will appreciate that the intake piping running with the same lengths and bends balances the intake charge. Moreover, the left and right exhaust piping 32 and 34 being of the same length provides an equal balance to a V-type engine. This makes each cylinder run more uniformly, thus the engine or motor 30 will run smoother, rev quicker, and have greater power and reliability potential. Moreover, differences in the lengths and configuration of the intake and exhaust piping will not need to be taken into account when tuning up the engine for optimal performance, as these pipes will be of the same length and configuration. Thus, one bank of cylinders will not need to be adjusted in relation to the other bank of cylinders due to any differences in intake or exhaust piping length and configurations, as is currently the case.

Although several embodiments have been described in some detail for purposes of illustration, various modifications may be made without departing from the scope and spirit of the invention. Accordingly, the invention is not to be limited, except as by the appended claims.

What is claimed is:

1. A turbocharger system for a V-block engine, comprising:
a first turbocharger operably connected to a first side of the V-block engine and including a first exhaust portion having a first exhaust turbine disposed therein and rotatable in a first direction in response to engine exhaust gases acting thereon, and a first air compressor portion having a first impeller therein operably connected to the first exhaust turbine so as to rotate in the first direction as viewed along the direction of the first impeller air inlet of the first turbocharger; and
a second turbocharger operably connected to a second side of the V-block engine and including a second exhaust portion having a second exhaust turbine disposed therein and rotatable in a second direction opposite that of the first direction of the first turbocharger exhaust turbine in response to engine exhaust gases acting thereon, and a second air compressor portion having a second impeller therein operably connected to the second exhaust turbine so as to rotate in the second direction opposite that of the first direction of the first turbocharger air compressor impeller as viewed along the direction of the second impeller air inlet of the second turbocharger;

whereby the first and second turbochargers are arranged on the V-block engine so as to be mirror images of each other.

2. The turbocharger system of claim 1, including a first rotatable rod extending between and interconnecting the first exhaust turbine and the first air compressor impeller and a second rotatable rod extending between and interconnecting the second exhaust turbine and the second air compressor impeller.

3. The turbocharger system of claim 1, wherein the first air compressor impeller of the first turbocharger includes a plurality of first fan blades oriented so that front surfaces thereof face a first direction, and wherein the second air compressor impeller of the second turbocharger includes a plurality of second fan blades oriented so that front surfaces thereof face an opposite second direction.

4. The turbocharger system of claim 1, including at least one first exhaust pipe extending from the first turbocharger, and at least one second exhaust pipe extending from the second turbocharger, the at least one first and second exhaust pipes being of substantially the same length and mirror image configurations of one another.

5. The turbocharger system of claim 4, wherein the at least one first exhaust pipe extends between a first exhaust intake port of the first turbocharger and a first set of exhaust outlets of the engine, and the at least one second exhaust pipe extends between a second exhaust intake port of the second turbocharger and a second set of exhaust outlets of the engine.

6. The turbocharger system of claim 1, including a first air intake pipe extending from the first turbocharger, and a second air intake pipe extending from the second turbocharger, the first and second air intake pipes being of substantially the same length and mirror image configurations of one another.

7. The turbocharger system of claim 6, wherein the first air intake pipe has a first end connected to a first air intake port of the first turbocharger and a second end adapted to deliver compressed air to the engine, and the second air intake pipe has a first end connected to a second air intake port of the second turbocharger and a second end adapted to deliver compressed air to the engine.

8. A turbocharger system for a V-block engine, comprising:
a first turbocharger operably connected to a first side of the V-block engine and including a first exhaust portion having a first exhaust turbine disposed therein and rotatable in a first direction in response to engine exhaust gases acting thereon, and a first air compressor portion having a first impeller therein, a first rotatable rod interconnecting the first exhaust turbine and the first impeller such that as the first exhaust turbine is rotated in a first direction, the first impeller is rotated in the first direction as viewed along the direction of the first impeller air inlet of the first turbocharger;
a first exhaust pipe extending from the first turbocharger;
a second turbocharger operably connected to a second side of the V-block engine and including a second exhaust portion having a second exhaust turbine disposed therein and rotatable in a second direction opposite that of the first direction of the first turbocharger exhaust turbine in response to engine exhaust gases acting thereon, and a second air compressor portion having a second impeller therein, a second rotatable rod interconnecting the second exhaust turbine and the second impeller such that as the second exhaust turbine is rotated in the second direction, the second impeller is rotated in the second direction as viewed along the direction of the second impeller air inlet of the second turbocharger; and
a second exhaust pipe extending from the second turbocharger;
wherein the first and second turbochargers are arranged on the V-block engine so as to be mirror images of each other; and
wherein the first and second exhaust pipes are of substantially the same length and have mirror image configurations.

9. The turbocharger system of claim 8, wherein the first air compressor impeller of the first turbocharger includes a plurality of first fan blades oriented so that front surfaces thereof face a first direction, and wherein the second air compressor impeller of the second turbocharger includes a plurality of second fan blades oriented so that front surfaces thereof face an opposite second direction.

10. The turbocharger system of claim 8, wherein the first exhaust pipe extends between a first exhaust intake port of the first turbocharger and a first set of exhaust outlets of the engine, and the second exhaust pipe extends between a second exhaust intake port of the second turbocharger and a second set of exhaust outlets of the engine.

11. The turbocharger system of claim 8, including a first air intake pipe extending from the first turbocharger, and a second air intake pipe extending from the second turbocharger, the first and second air intake pipes being of substantially the same length and mirror image configurations of one another.

12. The turbocharger system of claim 11, wherein the first air intake pipe has a first end connected to a first air intake port of the first turbocharger and a second end adapted to deliver compressed air to the engine, and the second air intake pipe has a first end connected to a second air intake port of the second turbocharger and a second end adapted to deliver compressed air to the engine.

13. A turbocharger system for a V-block engine, comprising:
a first turbocharger operably connected to a first side of the V-block engine and including a first exhaust portion having a first exhaust turbine disposed therein and rotatable in a first direction in response to engine exhaust gases acting thereon, and a first air compressor portion having a first impeller therein, a first rotatable rod interconnecting the first exhaust turbine and the first impeller such that as the first exhaust turbine is rotated in a first direction, the first impeller is rotated in the first direction as viewed along the direction of the first impeller air inlet of the first turbocharger;
a first air intake pipe extending from the first turbocharger;
a second turbocharger operably connected to a second side of the V-block engine and including a second exhaust portion having a second exhaust turbine disposed therein and rotatable in a second direction opposite that of the first direction of the first turbocharger exhaust turbine in response to engine exhaust gases acting thereon, and a second air compressor portion having a second impeller therein, a second rotatable rod interconnecting the second exhaust turbine and the second impeller such that as the second exhaust turbine is rotated in the second direction, the second impeller is rotated in the second direction as viewed along the direction of the second impeller air inlet of the second turbocharger; and a second air intake pipe extending from the second turbocharger;

wherein the first and second turbochargers are arranged on the V-block engine so as to be mirror images of each other; and wherein the first and second air intake pipes are of substantially the same length and have mirror image configurations.

14. The turbocharger system of claim 13, wherein the first air compressor impeller of the first turbocharger includes a plurality of first fan blades oriented so that front surfaces thereof face a first direction, and wherein the second air compressor impeller of the second turbocharger includes a plurality of second fan blades oriented so that front surfaces thereof face an opposite second direction.

15. The turbocharger system of claim 13, wherein the first air intake pipe has a first end connected to a first air intake port of the first turbocharger and a second end adapted to deliver compressed air to the engine, and the second air intake pipe has a first end connected to a second air intake port of the second turbocharger and a second end adapted to deliver compressed air to the engine.

16. The turbocharger system of claim 13, including at least one first exhaust pipe extending from the first turbocharger, and at least one second exhaust pipe extending from the second turbocharger, the at least one first and second exhaust pipes being of substantially the same length and mirror image configurations of one another.

17. The turbocharger system of claim 16, wherein the at least one first exhaust pipe extends between a first exhaust intake port of the first turbocharger and a first set of exhaust outlets of the engine, and the at least one second exhaust pipe extends between a second exhaust intake port of the second turbocharger and a second set of exhaust outlets of the engine.

* * * * *